(12) United States Patent
Lee (10) Patent No.: US 12,430,270 B1
(45) Date of Patent: Sep. 30, 2025

(54) MULTI-PORT SRAM SYSTEM FOR A DISTRIBUTED MEMORY POOL

(71) Applicant: TEXAS MILKYWAY INC., Plano, TX (US)

(72) Inventor: Sheau-Jiung Lee, Plano, TX (US)

(73) Assignee: Texas Milkyway Inc., Plano, TX (US)

( * ) Notice: Subject to any disclaimer, the term of this patent is extended or adjusted under 35 U.S.C. 154(b) by 0 days.

(21) Appl. No.: 18/961,439

(22) Filed: Nov. 26, 2024

(51) Int. Cl.
*G06F 13/40* (2006.01)
*G06F 13/16* (2006.01)
*G06F 13/42* (2006.01)

(52) U.S. Cl.
CPC ...... *G06F 13/4018* (2013.01); *G06F 13/1621* (2013.01); *G06F 13/4234* (2013.01)

(58) Field of Classification Search
CPC ............. G06F 13/4018; G06F 13/1621; G06F 13/4234
See application file for complete search history.

(56) References Cited

U.S. PATENT DOCUMENTS

| | | | |
|---|---|---|---|
| 5,026,833 A | 6/1991 | Suzuki | |
| 5,790,048 A * | 8/1998 | Hsieh | H03K 19/1736 370/363 |
| 2003/0212853 A1 * | 11/2003 | Huppenthal | G06F 15/7867 711/104 |
| 2004/0193805 A1 * | 9/2004 | Au | G06F 5/10 711/131 |
| 2006/0098519 A1 * | 5/2006 | Kwon | G11C 7/1075 365/230.05 |
| 2006/0146201 A1 * | 7/2006 | Chung | G11C 7/16 348/441 |
| 2008/0046665 A1 * | 2/2008 | Kim | G06F 9/544 711/149 |
| 2018/0032436 A1 * | 2/2018 | Lee | G06F 13/00 |
| 2019/0384501 A1 * | 12/2019 | Jagtap | G06F 3/068 |
| 2021/0042226 A1 * | 2/2021 | Ware | G06F 12/0855 |
| 2023/0035610 A1 | 2/2023 | Lee | |

* cited by examiner

*Primary Examiner* — Phong H Dang
(74) *Attorney, Agent, or Firm* — Vedder Price P.C.

(57) ABSTRACT

Multiple examples are disclosed of a multi-port SRAM system for a distributed memory pool and associated methods. In one example, a system comprises a memory bus switch coupled to a plurality of memory buses; a memory pool switch coupled to one or more memory arrays; and one or more SRAM blocks coupled to the memory bus switch and the memory pool switch to convert a first transaction received on one of the plurality of memory buses to a second transaction performed on the one or more memory arrays.

16 Claims, 8 Drawing Sheets

Physical Address Map
200

| Physical address map for UMA | | | | | |
|---|---|---|---|---|---|
| Memory type | function | Header base offset | Address Top | Address Bottom | space size |
| Host cacheable memory | APP / OS kernel | xH0000_0000_0000 | xH0003_BFFF_FFFF | xH0000_0000_0000 | 15G byte |
| memory mapped register control | Register control | xH0004_0000_0000 | xH0004_0FFF_FFFF | xH0004_0000_0000 | 256M byte |
| System non-cacheable memory | | | | | |
| | Frame buffer | xH0005_0000_0000 | xH0005_01FF_FFFF | xH0005_0000_0000 | 32M byte |
| | CPU-NPU exchange memory | xH0005_1000_0000 | xH0005_107F_FFFF | xH0005_1000_0000 | 8M byte |
| | CPU-GPU exchange memory | xH0005_2000_0000 | xH0005_207F_FFFF | xH0005_2000_0000 | 8M byte |
| | CPU-media exchange memory | xH0005_3000_0000 | xH0005_307F_FFFF | xH0005_3000_0000 | 8M byte |
| NPU local memory | | | | | |
| | NPU local working memory | xH0100_0000_0000 | xH0102_FFFF_FFFF | xH0100_0000_0000 | 12G byte |
| | NPU model weight and bias | xH0200_0000_0000 | xH02FF_FFFF_FFFF | xH0200_0000_0000 | 1T byte |
| GPU local memory | | | | | |
| | vertex shader, texture caching etc | xH0300_0000_0000 | xH0300_FFFF_FFFF | xH0300_0000_0000 | 4G byte |
| Media processor local memory | | | | | |
| | local working memory | xH0400_0000_0000 | xH0400_3FFF_FFFF | xH0400_0000_0000 | 1G byte |

Bus Protocol
400

Bus Protocols for SRAM Block

| | | | |
|---|---|---|---|
| Memory write bus request | clk_SRAM | Synchronous clock for each of 6 SRAM blocks | input |
| | valid_mw | Memory write request for each of 6 SRAM blocks | input |
| | ready_mw | Write ready signal feedback to the memory switch from each of 6 SRAM blocks | output |
| | tag_mw[47:24] | Cache tag for SRAM block during write. Cacheable address is up to 256T byte. | input |
| | addr_mw[23:7] | Memory address for SRAM block of 16M byte | input |
| | mask_mw[31:0] | Memory byte mask is applied for each SRAM block during write operations, with a 1024-bit wide data bus per block. The write data has a fixed burst length of 4. | input |
| | ecc_mw[9:0] | ECC is applied to each of the ten 256-bit wide SRAM blocks, with write operations performed in four bursts of 256-bit data, making the total width 1024 bits per block. | input |
| | dq_mw[255:0] | Memory write operations occur across each of the six SRAM blocks during a 4-burst sequence, with each burst consisting of 256-bit data. | input |
| Memory read request bus | valid_mr | Memory read request for each of 6 SRAM blocks | input |
| | ready_mr | Read ready signal feedback to the memory switch from each of 6 SRAM blocks | output |
| | tag_mr[47:24] | Cache tag for SRAM block during read. Cacheable address is up to 256T byte. | input |
| | addr_mr[23:7] | Memory address for 16M byte SRAM block | input |
| | rdqs_mr | Read data strobe for SRAM block | output |
| | ecc_mr[9:0] | ECC for each of 6 of 128 bit, 1024 bit wide SRAM block during read with 4 burst of 256 bit | output |
| | dq_mr[255:0] | Memory read data each of 6 SRAM block during read with 4 burst of 256 bit | output |
| Memory flush bus | valid_flush | Memory flush request for each of 6 SRAM blocks | output |
| | ready_flush | Flush ready return from memory pool switch | input |
| | addr_flush[47:7] | Memory flush address to the memory pool | output |
| | ecc_flush[9:0] | ECC for each of 6 of 128 bit, 1024 bit wide SRAM block during flush with 4 burst of 256 bit | output |
| | dq_flush[255:0] | Memory flush data each of 6 SRAM block during flush with 4 burst of 256 bit | output |
| Memory update bus | valid_update | Memory update request for each of 6 SRAM blocks during memory update | output |
| | ready_update | update ready return to the memory pool switch | input |
| | addr_update[47:7] | Memory update address to the memory pool | output |
| | rdqs_flush | Update data strobe from the memory pool switch | input |
| | ecc_update[9:0] | ECC for each of 6 of 128 bit, 1024 bit wide SRAM block during update with 4 bursts of 256 bit | input |
| | dq_update[255:0] | Memory update data each of 6 SRAM block during flush with 4 burst of 256 bit | input |

MULTI-PORT SRAM SYSTEM FOR A DISTRIBUTED MEMORY POOL

TECHNICAL FIELD

Multiple examples are disclosed of a multi-port SRAM system for a distributed memory pool and associated methods.

BACKGROUND

To harness the potential of high-performance computing (HPC) architectures, which involve using multiple processors to solve complex problems, memory pool techniques have been proposed. Modern System-on-Chip (SoC) designs, incorporating chiplets and chipsets, have become essential for increasing the number of parallel concurrent processing units, such as CPUs, neural processing units (NPUs), and graphics processing units (GPUs), to maximize parallel processing in generative artificial intelligence applications.

The proposed memory pool builds upon the concept of Unified Memory Access (UMA), aiming to enable high performance and scalability in heterogeneous systems comprising multiple host processor clusters (e.g., CPUs) and co-processor clusters (e.g., GPUs, NPUs). However, silicon size limitations and performance requirements often necessitate the adoption of Non-Uniform Memory Access (NUMA) architecture, particularly when dealing with a large number of host and co-processor clusters. NUMA assigns memory locally to each processing cluster, potentially hindering scalability, especially when inter-cluster communication becomes a bottleneck.

To overcome these challenges, a distributed local memory system must operate as a unified memory system within the broader heterogeneous environment. A key challenge in designing such a system is the diverse behavior of individual memory units due to the heterogeneous nature of processing. Host processors and co-processors have distinct data flows, requiring independent configuration of each memory pool. Additionally, variations in memory access latency, especially when using different memory types like DRAM and NVRAM, pose further complexities.

What is needed is a new architecture to bridge the performance gap between different processor types and memory types.

SUMMARY OF THE INVENTION

To mitigate latency issues, a high-performance SRAM cache is proposed to bridge the performance gap between memory types. As host processors and co-processors access memory differently, the SRAM cache must support various caching algorithms to prevent cache thrashing and optimize performance across the heterogeneous system. Moreover, to support the system disclosed by the same inventor in U.S. Patent Application Publication No. 2023/0035610, titled "Hybrid System Fabric for Enabling Host Operating System and Real-time Operating System Within Chiplet System-on-chip," which is incorporated by reference, a portion of the SRAM should be configured as exchange memory between host and real-time operating systems within chiplet-based SoCs The proposed invention outlines an SRAM system with multiple ports to support concurrent read and write operations across multiple memory buses, using a single-port SRAM units. This approach will enhance the concurrency of the system disclosed by the same inventor in U.S. Pat. No. 5,206,833, titled "Pipelined Dual-port RAM," which is incorporated by reference, by increasing the number of ports.

The SRAM system within each memory pool can be configured flexibly to handle various memory cycles, such as cacheable, non-cacheable, exchange, prefetch, and post-write operations. This allows the system to function as a unified fast memory for various processors, regardless of whether it consists of DRAM or NVRAM. With a distributed memory pool, the aggregate SRAM size can be expanded, enabling individual memory pools to be configured differently within the larger structure, optimizing unified memory access and fully exploiting the parallel processing capabilities of CPUs, GPUs, and NPUs.

In one example, a system comprises a memory bus switch coupled to a plurality of memory buses; a memory pool switch coupled to one or more memory arrays; and one or more SRAM blocks coupled to the memory bus switch and the memory pool switch to convert a first transaction received on one of the plurality of memory buses to a second transaction performed on the one or more memory arrays.

In another example, a method comprises routing, by a memory bus switch, transactions from a plurality of memory buses to one or more SRAM blocks; and routing, by a memory pool switch, transactions from the one or more SRAM blocks to one or more memory arrays.

BRIEF DESCRIPTION OF THE DRAWINGS

FIG. 4 depicts a bus protocol.

DETAILED DESCRIPTION OF THE INVENTION

Figure 1:
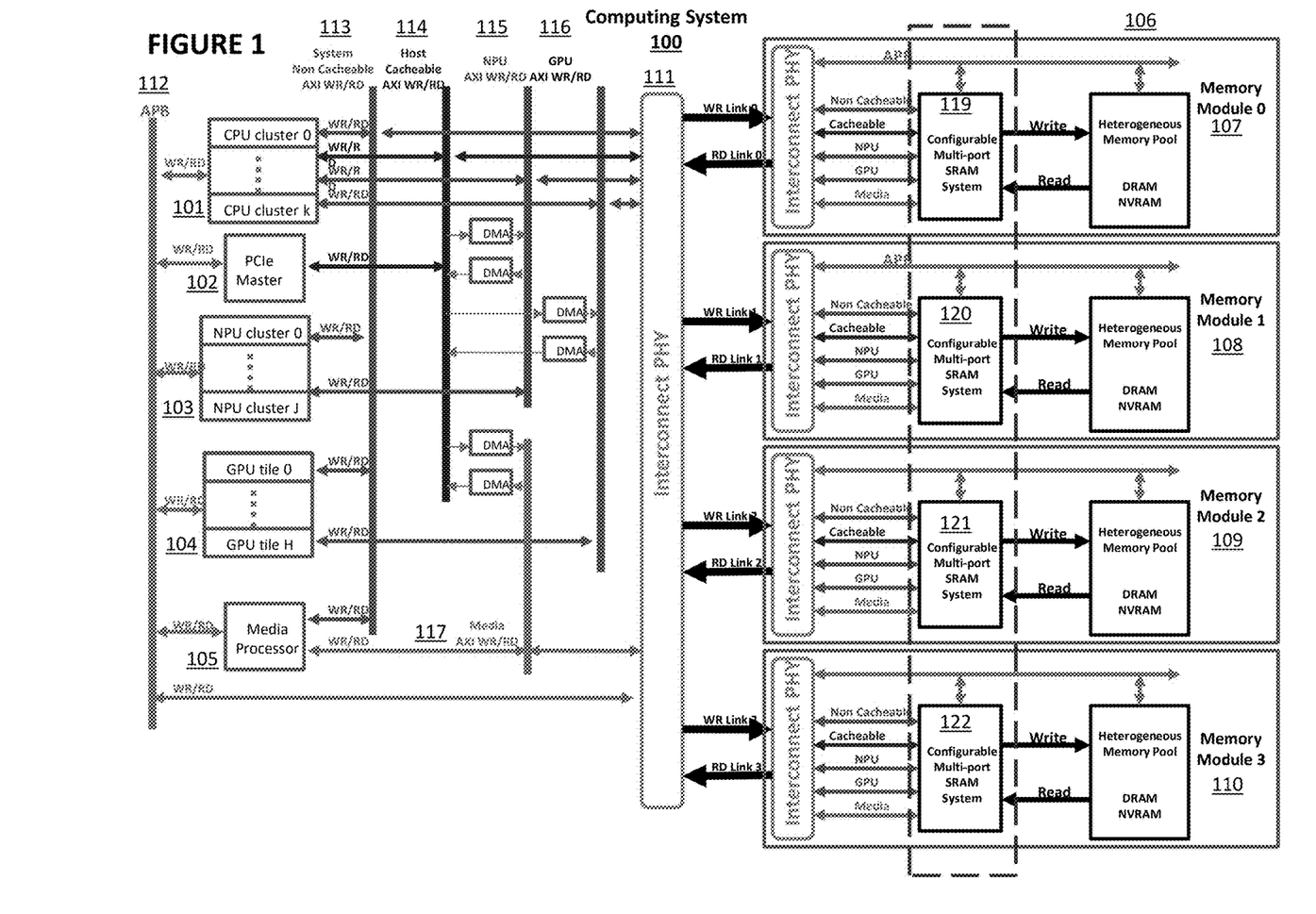
FIG. 1 depicts a computing system.

FIG. 1 depicts computing system 100 comprising host processor unit (CPU) 101 and various co-processor units such as PCIe master 102, neural processing unit (NPU) 103, graphics processing unit (GPU) 104, and media processor unit (MPU) 105. These components are interconnected to distributed memory pool 106, which is a hardware component configured in this example as a quad-module configuration comprising memory modules 107, 108, 109, and 110. Distributed memory pool 106 also comprises SRAM cache system 118, which comprises configurable multi-port SRAM systems 119, 120, 121, and 122 which are part of memory modules 107, 108, 109, and 110, respectively. The memory configuration is scalable, allowing the number of memory modules to be adjusted based on specific memory requirements. This flexibility includes the option to expand beyond the quad-module setup for increased memory capacity or reduce it for smaller memory needs. The memory modules 107, 108, 109, and 110 are physically separated from the SoC containing host processor 101 and co-processors 102, 103, 104, and 105 and can be monolithic, chiplet-based, or contained in another architecture.

An interconnect PHY 111 links memory modules 107, 108, 109, and 110 into distributed memory pool 106 that supports a Unified Memory Access (UMA) architecture, accessible to all host processor 101 and co-processors 102, 103, 104, and 105. UMA allows all processors to directly access target physical addresses in memory without the need for memory allocation or deallocation. Distributed memory pool 106 helps prevent memory collisions among concurrent processing units, resulting in improved performance scaling as the number of processing units increases. To accommodate the diverse bus cycle behaviors of different processors and their varying data coherency algorithms, the memory pool must support a range of bus cycle behaviors.

A unified memory architecture, which allows all processing units to access shared memory without the need for local dedicated memory, requires a physical memory address map. Each memory unit must incorporate exchange memory to facilitate data transfer between various processing units, such as CPU-GPU, CPU-NPU, CPU-MPU, MPU-GPU, and NPU-GPU interactions. FIG. 1 depicts distinct memory buses for these tasks, including the APB bus (a system memory-mapped control register bus) 112, system non-cacheable memory bus (exchange memory) 113, host cacheable memory bus 114, NPU dedicated memory bus 115, GPU dedicated memory bus 116, and media processor (e.g., image, video, or audio decoders/encoders) dedicated memory bus 117.

An ideal memory fabric, which refers to the interconnection of memory components within the SoC, should maximize concurrency, allowing all buses in the SoC to access memory simultaneously for both reading and writing operations. The memory system is also required to support concurrent access from multiple buses. Together, these features enable efficient data transfer and avoid bottlenecks in the memory system.

Figure 2:
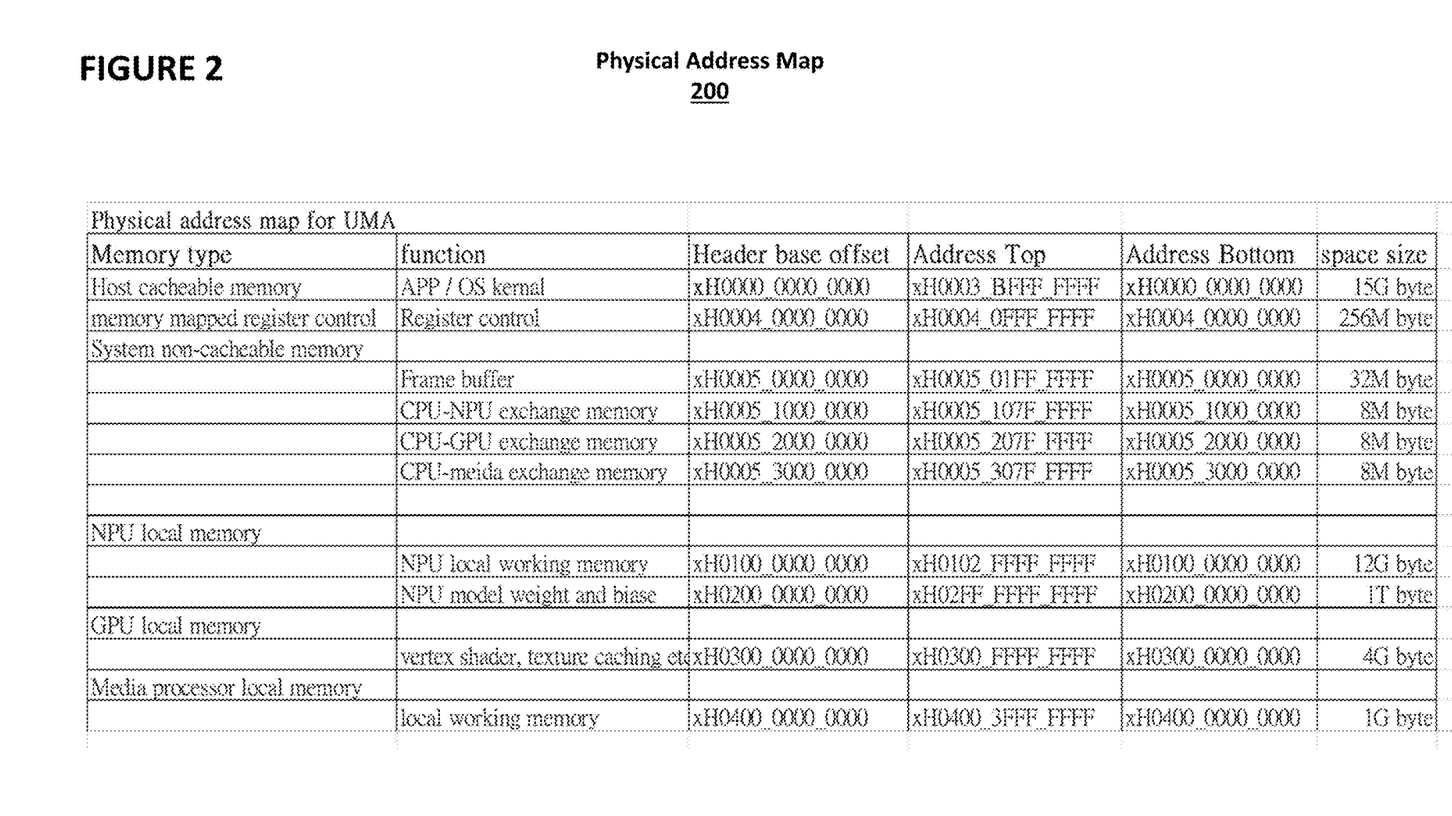
FIG. 2 depicts a physical address map.

FIG. 2 illustrates physical address map 200, which maps local virtual memory addresses utilized by operating systems of processors 101, 102, 103, 104, and 105 to physical memory addresses within distributed memory pool 106 of FIG. 1. The total memory size in this example configuration includes 32 GB of DRAM, 1 terabyte of NVRAM, and a configurable 384 MB multi-port SRAM system, distributed across a quad memory pool.

Physical address map 200 allocates portions of physical memory in distributed memory pool 106 of FIG. 1 to host cacheable memory (optionally accessed over host cacheable memory bus 114 in FIG. 1), memory mapped register control (optionally accessed over APB bus 112 in FIG. 1), system non-cacheable memory (optionally accessed over system non-cacheable memory bus 113), NPU local memory (optionally accessed over NPU dedicated memory bus 115), GPU local memory (optionally accessed over GPU dedicated memory bus 116), and media processor local memory (optionally accessed over media processor dedicated memory bus 117).

Physical address map 200 can be adjusted and utilized in various scenarios, including edge devices supporting inference for generative AI applications with local training. The memory configuration is scalable, allowing for adjustments to accommodate different memory requirements. The system can support several terabytes of DRAM, hundreds of terabytes of NVRAM, and tens of gigabytes of SRAM, making it suitable for large-scale generative AI training and inference on supercomputing servers. Memory space allocation can be further dynamically customized to optimize performance for specific target applications.

It should be noted that before customizing the memory space, any data residing in the SRAM portion that needs to be re-allocated should be flushed back to DRAM or NVRAM to ensure data coherency.

Figure 3:
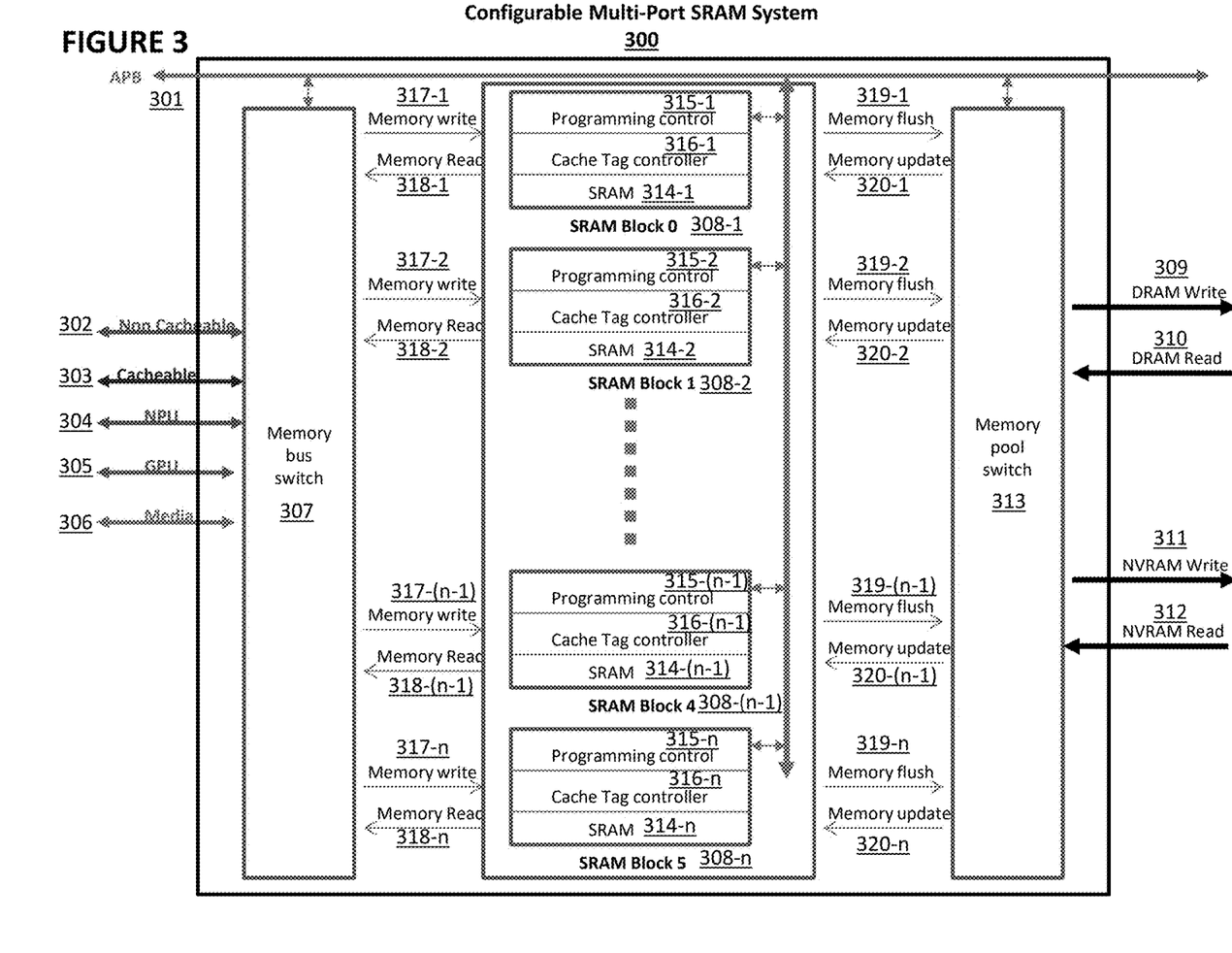
FIG. 3 depicts a configurable multi-port SRAM system.

FIG. 3 illustrates configurable multiport SRAM system 300 that can be used for configurable multiport SRAM systems 119, 120, 121, and 122 that are integrated within memory modules 107, 108, 109, and 110, respectively, in FIG. 1. A multiport SRAM system is a type of memory architecture that implements a multiport SRAM using underlying single-port SRAM units and additional circuitry for concurrency between multiple ports.

Configurable multiport SRAM system 300 comprises: (1) multiple memory buses corresponding to the physical address map in FIG. 2, including advanced peripheral bus (APB) 301, system non-cacheable bus 302, host cacheable memory bus 303, NPU memory bus 304, GPU memory bus 305, and media processor bus 306; (2) memory bus switch 307 capable of directing multiple memory bus requests simultaneously to n different SRAM blocks 308-1, 308-2, . . . , 308-(n−1), and 308-n; (3) multiple memory pool buses, including DRAM write bus 309, DRAM read bus 310, NVRAM write bus 311, and NVRAM read bus 312; and (4) memory pool bus switch 313 that directs memory flushes and updates from each SRAM block 308-1, 308-2, . . . , 308-(n−1), 308-n to the appropriate memory pool bus 309, 310, 311, or 312.

SRAM blocks 308-1, 308-2, . . . , 308-(n−1), 308-n comprise SRAM systems 314-1, 314-2, . . . , 314-(n−1), 314-n, respectively, each of which comprises multiple physical SRAM units. Each SRAM block has a quad-bus port supporting simultaneous operations for memory write, memory read, memory flush, and memory update.

SRAM blocks 308-1, 308-2, . . . , 308-(n−1) are composed of three functional components: (1) programming control blocks 315-1, 315-2, . . . , 315-(n−1), 315-n, respectively, that each configures the SRAM block for various functions such as cacheable or non-cacheable operations and applies different cache algorithms to each separated SRAM block to optimize the cache hit rate; (2) cache tag controllers 316-1, 316-2, . . . , 316-(n−1), 316-n, respectively, that each manages various caching algorithms, cache line sizes, prefetch algorithms, etc. for each of separated SRAM block in SRAM system for each memory module; and (3) SRAM units 314-1, 314-2, . . . , 314-(n−1), 314-n, respectively, used for cacheable or non-cacheable functions.

In this example, each SRAM block 308 has a size of 16 MB. If n=6, SRAM blocks 308-1, 308-2, . . . , 308-5, and 308-6 will have a total size of 96 MB SRAM. Using this configuration for configurable multi-port SRAM systems 119, 120, 121, and 122 results in 384 MB of SRAM for distributed memory pool 106 in computing system 100 shown in FIG. 1.

With reference again to FIG. 3, SRAM blocks 308-1, 308-2, . . . , 308-(n−1), 308-n each comprises four ports: (1) memory write request port 317-1, 317-2, . . . , 317-(n−1), 317-n, respectively, (2) memory read request port 318-1, 318-2, . . . , 318-(n−1), 318-n, respectively, (3) memory flush port 319-1, 319-2, . . . , 319-(n−1), and 319-n, respectively, and (4) memory update port 320-1, 320-2, . . . , 320-(n−1), 320-n, respectively. These four ports operate simultaneously in a quad-port fashion, allowing for concurrent operations.

In certain configurations, the SRAM block 308 will disable the memory flush port 319 and memory update port 320 if it is configured as non-cacheable memory, meaning it will not be used to store cached data. An SRAM block designed for exchange memory purposes does not require memory flush and memory update operations with the memory pool.

Defining an effective bus protocol for the SRAM blocks 308-1, 308-2, . . . , 308-(n−1), and 308-n is crucial to achieving high performance in terms of latency and bandwidth. This involves designing a protocol that enables four-port SRAM blocks 308-1, 308-2, . . . , 308-(n-1), and 308-n efficiently interface with memory bus switch 307 (a switch that manages the flow of data between the SRAM blocks and the memory bus) and memory pool switch 313 (a switch that manages access to the memory pool). By optimizing communication between the memory bus switch 307, memory pool switch 313, and multiple SRAM blocks 308, configurable multiple-port SRAM system 300 delivers high-performance, full-duplex read-write concurrent bandwidth with low latency.

FIG. 4 illustrates bus protocol 400 to be implemented by four-port SRAM blocks 308-1, 308-2, . . . , 308-(n-1), and 308-n. In this example, each of the four ports has an external data width of 256 bits, while the internal data width of each SRAM block is 1024 bits. Each memory read or write cycle requires four 256-bit bursts on one of the ports. The four ports are responsible for memory write, read, flush, and update cycles, respectively. These ports can operate concurrently to achieve maximum performance and minimize memory collisions.

Figure 5:
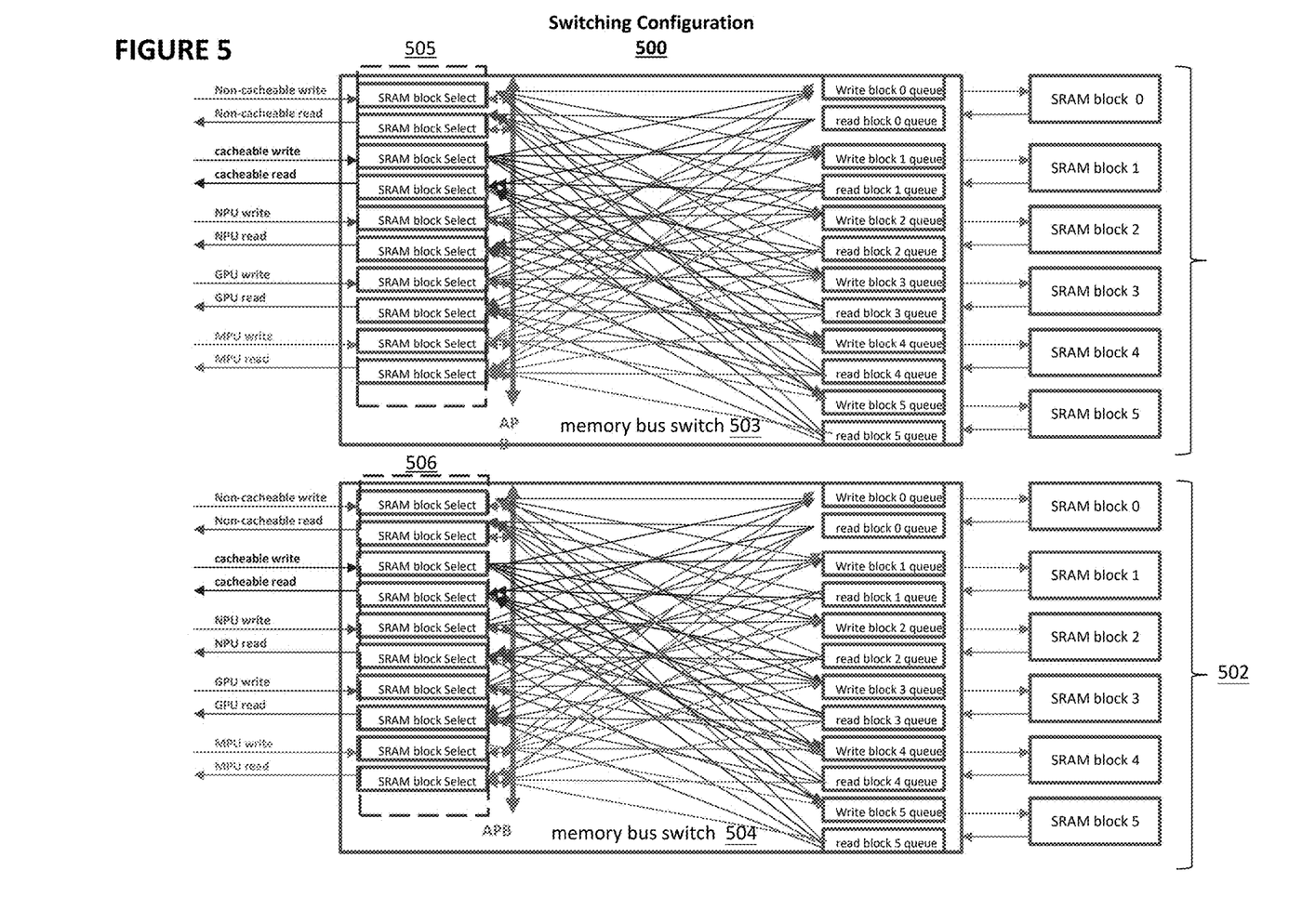
FIG. 5 depicts a switching configuration.

FIG. 5 depicts switching configuration 500, which is an example scenario wherein memory bus switches 503 and 504 (which are instances of memory bus switch 307 in FIG. 3) in memory modules 501 and 502 (which are any two of memory modules 107, 108, 109, and 110 of distributed memory pool 106 in FIG. 1) couples the various buses to various SRAM blocks. Different configurations are feasible for various distributed memory pools with varying numbers of memory modules.

In FIG. 5, memory modules 501 and 502 together contain have 12 SRAM blocks 308 in total, with each SRAM block 308 being 16 MB in size. This configuration results in a total configurable SRAM of 192 MB. Each memory module can also have 16 GB of DRAM (not shown) and 512 GB of NVRAM (not shown). The total memory size visible to the OS kernel is 32 GB of DRAM and 1 TB of NVRAM. Optionally, the 1 TB of NVRAM can be allocated for weight and bias coefficients for large AI models, which are static unless updated by new AI models.

In the example shown in FIG. 5, each memory bus switch 503 and 504 can configure its SRAM block select circuit 505 and 506, respectively, based on the physical address map of FIG. 2 to target specific SRAM blocks for the desired application. This allows the 12 SRAM blocks in the two separate memory modules to work together efficiently, optimizing performance for the target application.

The following example illustrates how to configure the SRAM block dynamically for a typical edge computing generative AI application:

1. Before the generative AI application is evoked for execution:

Block 0, module 501: Non-cacheable frame buffer (16 MB)

Block 0, module 502: Non-cacheable frame buffer (16 MB)

Block 1, module 501: Non-cacheable CPU-GPU exchange memory (16 MB)

Block 1, module 502: Non-cacheable CPU-NPU exchange memory (8 MB), CPU-MPU exchange memory (8 MB)

Block 2, module 501: Cacheable GPU local memory (16 MB)

Block 2, module 501: Cacheable MPU local memory (16 MB)

Block 3, block 4, block 5, module 501: Cacheable host system memory (48 MB)

Block 3, block 4, block 5, module 502: Cacheable host system memory (48 MB)

When the generative AI application is not in the task queue, most of the SRAM can be allocated for host system cache.

2. Once the generative AI application is in execution:

SRAM blocks 0, 1, and 2 in modules 501 and 502 remain unchanged.

SRAM blocks 3 and 4 in module 501 remain unchanged for cacheable host system memory (32 MB).

SRAM block 5 in module 501 is reconfigured for cacheable NPU local memory (16 MB).

SRAM block 3 in module 502 remain unchanged for cacheable host system memory (16 MB).

SRAM blocks 4 and 5 in module 502 are reconfigured for cacheable NPU local memory (32 MB).

Depending on whether DRAM is pre-allocated for the AI application in the OS kernel, it may be necessary to flush out block 5 in module 501 and block 4, 5 in module 502 when they are re-allocated for a different purpose. If DRAM is pre-allocated like GPU memory, flushing is not required. Otherwise, the SRAM blocks must be flushed to write dirty data back to DRAM before re-configuration.

There are several advantages to allocating SRAM blocks for the frame buffer. The frame buffer is constantly fetched and updated by the GPU and display controller. If DRAM were used for the frame buffer, a double buffer scheme (where two buffers are used alternately for reading and writing data) would be necessary to enable concurrent read and write operations. However, high-speed DRAM I/O circuits consume a significant amount of power. Integrated four-port SRAM blocks not only support concurrent read and write operations but also offer lower power consumption due to on-chip I/O. This is particularly important in low-power, high-performance edge device applications.

Figure 6:
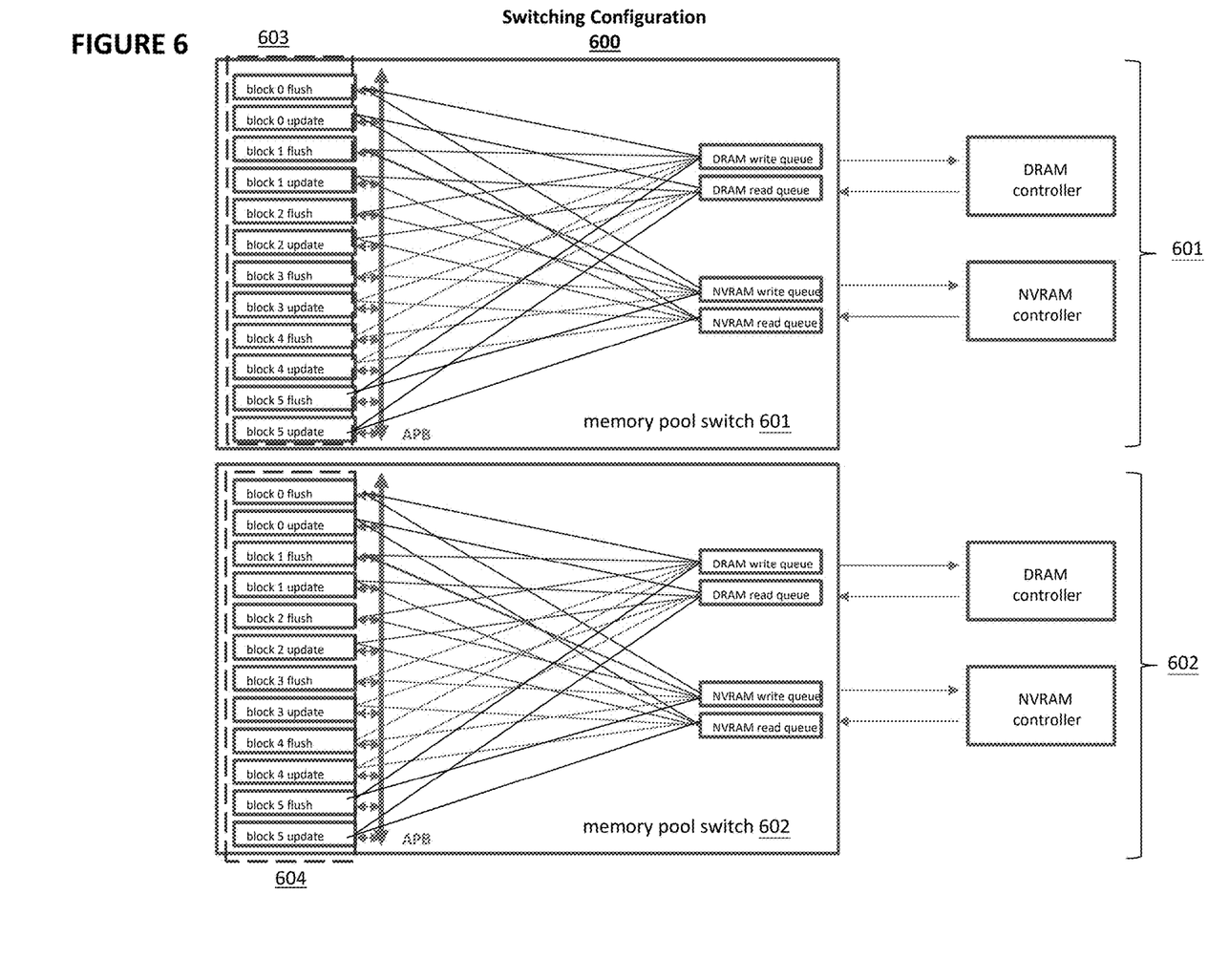
FIG. 6 depicts a switching configuration.

FIG. 6 depicts switching configuration 600, which is an example scenario wherein memory pool routing switches 603 and 604 in memory pool switches 601 and 602, respectively, (which are instances of memory pool switch 313 in FIG. 3) in memory modules 601 and 602 (which are any two of memory modules 107, 108, 109, and 110 of distributed memory pool 106 in FIG. 1) couples the various SRAM blocks to various DRAM and NVRAM units (which are part of distributed memory pool 106 in FIG. 1).

The SRAM blocks in memory modules 601 and 602 will be flushed to and updated from the each heterogeneous memory pool, which is a combination of DRAM and NVRAM. The APB bus can program both the DRAM space and the NVRAM space so that each SRAM block will flush or update with the correct memory in the distributed memory pool.

It should be noted that if an SRAM block is programmed as non-cacheable memory, there will be no request for flush or update from the SRAM block to the distributed memory pool.

Figure 7:
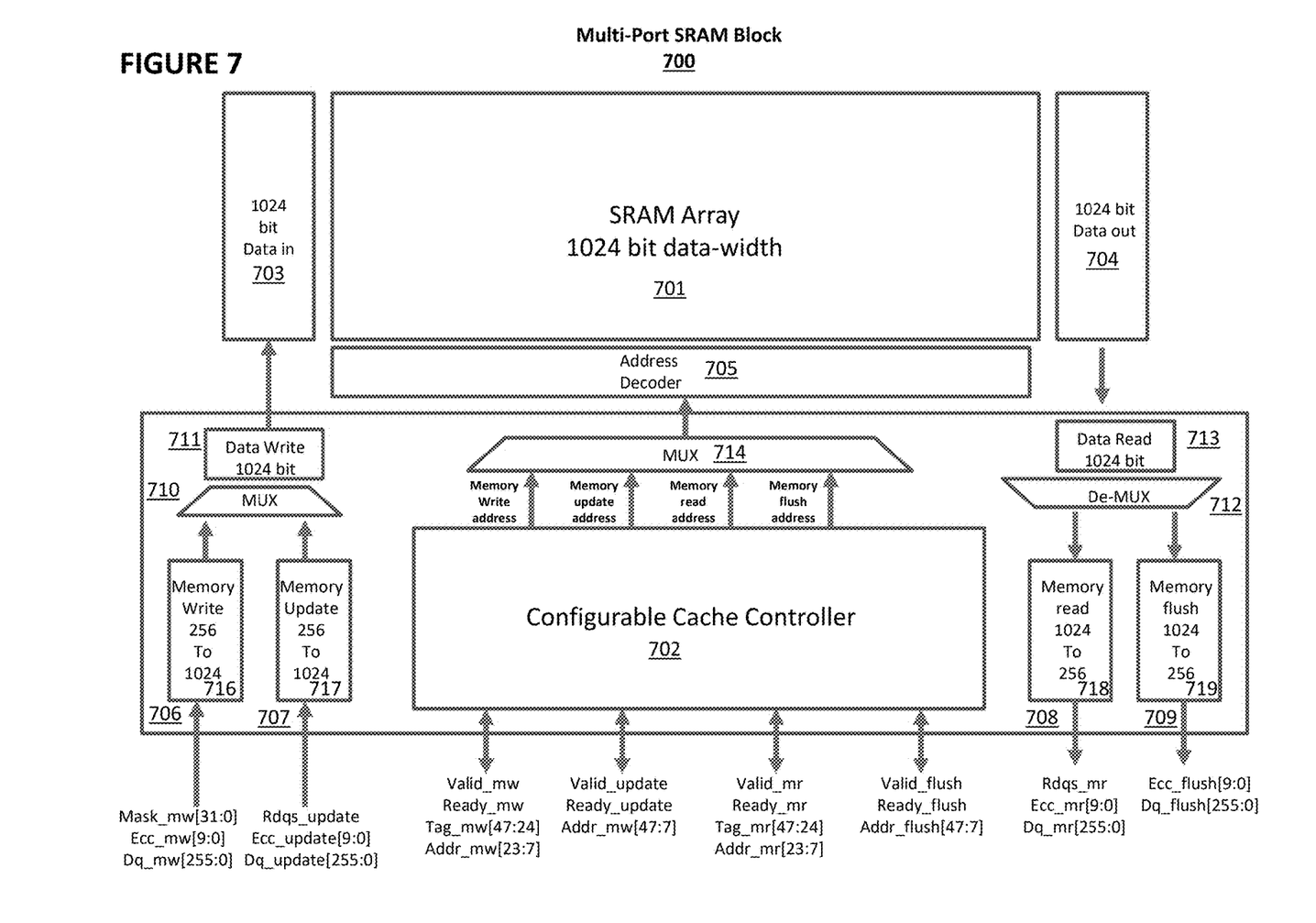
FIG. 7 depicts a multi-port SRAM block.

FIG. 7 illustrates Multi-Port SRAM block 700, which is an example implementation of SRAM blocks 308-1, 308-2, . . . , 308-(n-1), and 308-n shown in FIG. 3. Multi-Port SRAM block 700 comprises SRAM array 701, configurable cache controller 702, data-in buffer 703, data-out buffer 704, address decoder 705, memory write request port 706 (which is an example implementation of 317-1, 317-2, . . . , 317-(n-1), 317-n in FIG. 3), memory read request port 708 (which is an example implementation of memory read request port 318-1, 318-2, . . . , 318-(n-1), 318-*n* in FIG. 3, memory flush port 709 (which is an example implementation of memory flush port 319-1, 319-2, . . . , 319-(*n*–1), and 319-*n* in FIG. 3), memory update port 707 (which is an example implementation of memory update port 320-1, 320-2, . . . , 320-(*n*–1), 320-*n*), multiplexor 710, data write buffer 711, de-multiplexor 712, data read buffer 713, multiplexor 714, memory write request FIFO 716, memory read request FIFO 718, memory flush FIFO 719, and memory update FIFO 717, SRAM array 701 has a 1024-bit data width for write and read operations. Each external port of the SRAM block has a 256-bit data width. The bus command always executes a fixed burst length of 4 transfers. This can save a large number of I/O pins to avoid possible signal routing problems. The internal SRAM array is a typical single-port SRAM for minimizing silicon size.

Configurable cache controller 702 can use a time-based multiplexing scheme to select one of the four memory operations (memory write, memory read, memory flush, and memory update) to perform on the SRAM array. This allows all four memory operations to simultaneously access the SRAM array. Configurable cache controller 702 provides a memory write address, memory update address, memory read address, and memory flush address to multiplexor 714 along with a control signal to select the address to be output from multiplexor 714 at any given time.

For a memory write operation, the data associated with the memory write operation is received by memory write port 706, where it is then provided to multiplexor 710 which in turn provides the data to data write buffer 711, which then writes it into data-in buffer 703 at the same time that the memory write address is provided by multiplex 714 to address decoder 705. Address decoder 705 then provides the address to SRAM array 701 while the data from data-in buffer 703 is written into SRAM array 701 at the address specified by the address.

For a memory update operation, the data associated with a memory update operation is received by memory update port 707, where it is then provided to multiplexor 710 which in turn provides the data to data write buffer 711, which then writes it into data-in buffer 703 at the same time that the memory update address is provided by multiplexor 714 to address decoder 705. Address decoder 705 then provides the address to SRAM array 701 while the data from data-in buffer 703 is written into SRAM array 701 at the address specified by the address.

For a memory read operation, multiplexor 714 provides the memory read address to address decoder 705, which then applies the address to SRAM 701 during a read operation. The read data is output into data-out buffer, which provides the data to data read buffer 713, which providers the data to de-multiplexor 712, which provides the data to memory read port 708.

For a memory flush operation, multiplexor 714 providers the memory flush address to address decoder 705, which then applies the address to SRAM 701 during a read operation. The read data is output into data-out buffer 704, which provides the data to data read buffer 713, which provides the data to de-multiplexor 712, which provides the data to memory flush port 709.

Figure 8:
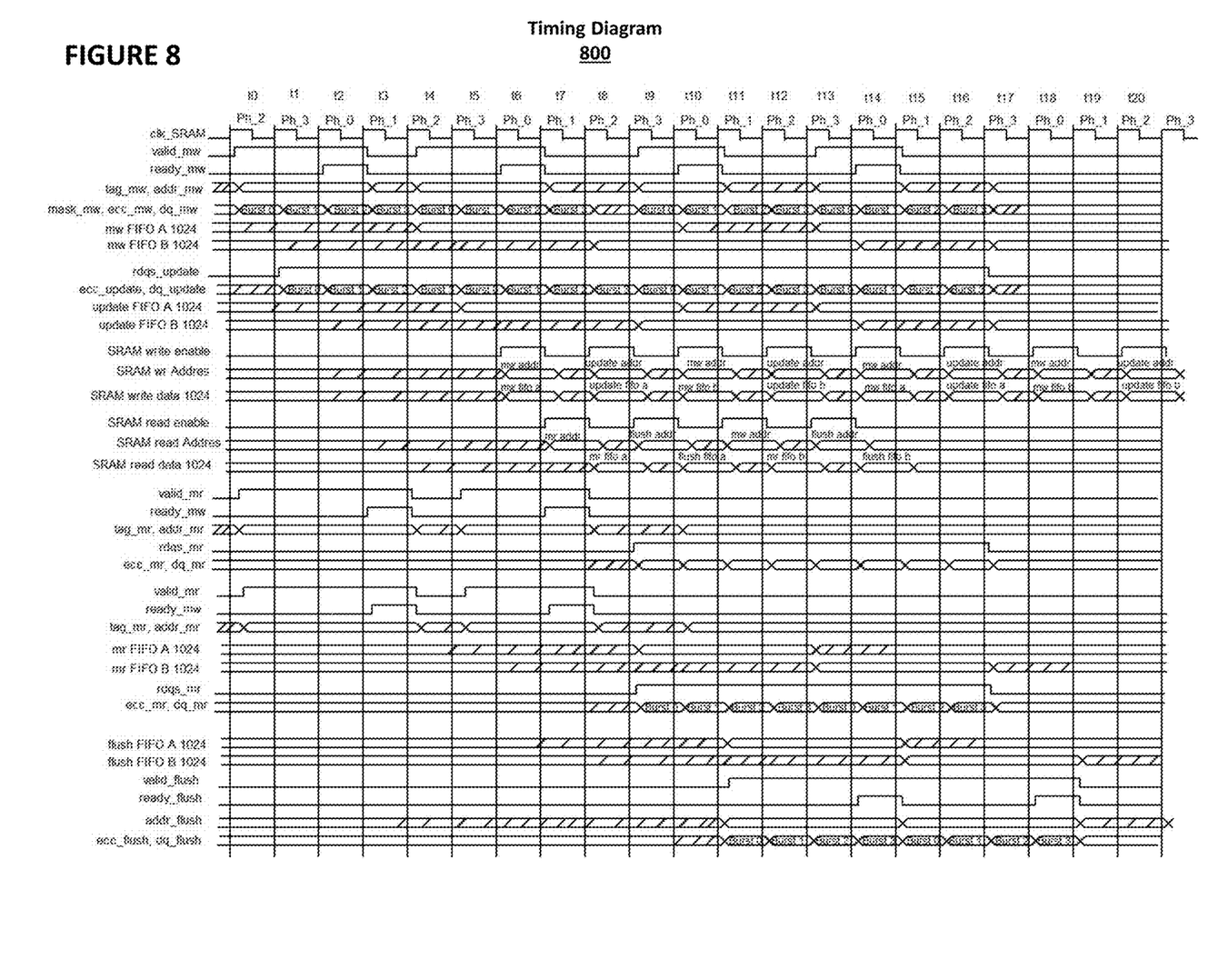
FIG. 8 depicts a timing diagram.

FIG. 8 depicts timing diagram 800, which illustrates how configurable cache controller 702 generates the timing sequence to control SRAM array 701 and other blocks in multi-port SRAM block 700 of FIG. 7. The external bus of the SRAM blocks can concurrently operate for write, read, flush, and update operations. The cache controller can insert wait states by asserting the ready signal when a cache miss occurs and an update or flush operation is required. The replacement and prefetch algorithms for each SRAM block can be individually configured through the APB bus for either caching to host processors or co-processors, taking into account their different memory access patterns and requirements.

As shown in the time steps t6 to t13, the SRAM array 701 is accessed in every clock phase, from phase 0 to phase 3. In phase 0 at t6, there is a memory write of 1024 bits to SRAM array 701. In phase 1 at t7, there is a memory read of 1024 bits from SRAM array 701. In phase 2 at t8, there is a memory update of 1024 bits to SRAM array 701. In phase 3 at t9, there is a memory flush of 1024 bits from SRAM array 701. Each of the four ports is connected to a ping pong FIFO (a type of first-in-first-out buffer that can be used to store and retrieve data in a circular fashion). The ping pong FIFO can perform 256-bit to 1024-bit de-multiplexing and 1024-bit to 256-bit multiplexing, as shown in FIG. 8. When there is a long burst of cache updates, as shown in FIG. 8 where the "rdqs_update" signal is asserted from t1 to t16 for a 16-long burst of 256 bits, the cache controller 702 can use the double ping pong FIFO to update the cache. This exemplifies the long data transfer or prefetch that can be used to support NPU data patterns. The configurable cache controller 702 can thus be configured to support both host processor short burst lengths and co-processor long burst lengths for different cache prefetch algorithms.

The operation and design of the embodiments described in FIGS. 1-8 can be summarized as follows.

1. Each individual configurable multiport SRAM system 119, 120, 121, and 122 (in a separate chip from the system-on-chip, connected by interconnect PHY 111) within the distributed memory pool 106 shown in FIG. 1 can be composed of a memory bus switch 307, a memory pool switch 313, and multiple four-port SRAM blocks 308, as illustrated in FIG. 3.

2. The memory bus switch 307 shown in FIG. 3 can route all memory buses (including the non-cacheable memory bus 302, cacheable memory bus 303, NPU memory bus 304, GPU memory bus 305, and media processor memory bus 306) to the memory write port 317 and memory read port 318 of different SRAM blocks 308 within the SRAM system shown in FIG. 3.

3. The SRAM block select circuits 505 and 506 shown in FIG. 5 can be programmed through the APB (advanced peripheral bus) to configure the physical address map (shown in FIG. 2). In this way, the memory size and functions of each individual SRAM system within the distributed memory pool can be optimized for the target applications, such as cacheable memory, non-cacheable memory, exchange memory, and local memory for co-processors.

4. The memory pool switch 313 shown in the FIG. 3 can route all memory flush request and memory update request from each individual SRAM block 308 within a SRAM system to DRAM system through DRAM write bus 309 and DRAM read bus 310 and to NVRAM through NVRAM write bus 311 and NVRAM read bus 312.

5. The memory pool routing switches 603 and 604 shown in FIG. 6 can be programmed through the APB (Advanced Peripheral Bus) to configure the physical address map (shown in FIG. 2). This allows the size and functions of each individual memory pool (DRAM and NVRAM) within the distributed memory pool to be optimized for target applications, such as cacheable memory, non-cacheable memory, exchange memory, and local memory for co-processors.

6. The multi-port SRAM block 700, shown in FIG. 7, connected to the memory bus switch and memory pool switch in the SRAM system, is composed of: 1) SRAM array 701 with a wide data width that is 4 times the external memory port data width. 2) A FIFO 716, 717, 718, and 719 connected to each external memory port 706, 707, 708, and 709, respectively, capable of multiplexing or de-multiplexing the SRAM array write data bus and read data bus. 3) A configurable cache controller 702 that can synchronize all memory operations from four external memory ports 706, 707, 708, and 709, as shown in the timing sequence in FIG. 8.

7. The bus protocol of multi-port SRAM block 700 is illustrated in FIG. 4. The request for a memory operation starts with a valid signal to each port. The cache controller can insert wait states by asserting the ready signal if the memory request requires additional clock cycles to complete. The typical protocol handshake for memory operations is illustrated in FIG. 8.

8. If the SRAM block is configured for non-cacheable memory such as frame memory or exchange memory, the configurable cache controller should be configured for non-cache operation. In non-cacheable mode, the configurable cache controller will only function to synchronize the external memory port concurrent memory read and write operations to the SRAM array. The memory flush and memory update functions will be disabled.

9. If the SRAM block is configured for cacheable memory, it could be host processor cache memory or co-processor cache memory. The cache algorithm is configured differently for the configurable cache controller.

10. If the SRAM block is configured to cache the host processor's system memory, a cache line of the SRAM block will be close to the host processor's cache line and with a less aggressive pre-fetch scheme with shorter burst lengths for memory flush and memory update. The cache operation will be optimized for memory access latency.

11. If the SRAM block is configured to cache the local memory of a co-processor (e.g., GPU or NPU), a cache line of the SRAM block will increase to match the size of the block transfers used by the co-processor's local memory. The pre-fetch scheme will be aggressive to support long bursts of memory update and memory flush. The cache operation will be optimized for memory bandwidth.

Materials, processes and numerical examples described above are mere examples, and should not be deemed to limit the claims. As used herein, the terms "over" and "on" both inclusively include "directly on" (no intermediate materials, elements or space disposed there between) and "indirectly on" (intermediate materials, elements or space disposed there between). Likewise, the term "adjacent" includes "directly adjacent" (no intermediate materials, elements or space disposed there between) and "indirectly adjacent" (intermediate materials, elements or space disposed there between). For example, forming an element "over a substrate" can include forming the element directly on the substrate with no intermediate materials/elements there between, as well as forming the element indirectly on the substrate with one or more intermediate materials/elements there between.

What is claimed is:

1. A system, comprising:
   a memory bus switch coupled to a plurality of memory buses;
   a memory pool switch coupled to one or more memory arrays, wherein each memory array comprises a NVRAM array coupled to an NVRAM controller;
   one or more SRAM blocks, wherein each SRAM block comprises a DRAM write queue and a DRAM read queue coupled to a DRAM controller; and
   the one or more SRAM blocks coupled to the memory bus switch and the memory pool switch to convert a first transaction received on one of the plurality of memory buses to a second transaction performed on the one or more memory arrays.

2. The system of claim 1, wherein the memory bus switch routes transactions from the plurality of memory buses to the one or more SRAM blocks.

3. The system of claim 2, wherein the memory pool switch routes transactions from the one or more SRAM blocks to the one or more memory arrays.

4. The system of claim 1, wherein the plurality of memory buses comprises two or more of a non-cacheable bus, a cacheable bus, an NPU bus, a GPU bus, and a media processor bus.

5. The system of claim 1, wherein the one or more memory arrays comprises one or more DRAM arrays coupled to a DRAM controller.

6. The system of claim 1, wherein each of the one or more SRAM blocks comprises a NVRAM write queue and a NVRAM read queue coupled to the NVRAM controller.

7. A system, comprising:
   a memory bus switch coupled to a plurality of memory buses;
   a memory pool switch coupled to one or more memory arrays; and
   one or more SRAM blocks coupled to the memory bus switch and the memory pool switch to convert a first transaction received on one of the plurality of memory buses to a second transaction performed on the one or more memory arrays;
   wherein each of the one or more SRAM blocks comprises:
      a memory write port for memory write transactions;
      a memory read port for memory read transactions;
      a memory flush port for memory flush transactions; and
      a memory update port for memory update transactions.

8. The system of claim 7, wherein each of the one or more SRAM blocks comprises:
   a memory write port FIFO coupled to the memory write port;
   a memory read port FIFO coupled to the memory read port;
   a memory flush port FIFO coupled to the memory flush port; and
   a memory update port FIFO coupled to the memory update port.

9. The system of claim 8, comprising:
   a cache controller to implement transactions received over the memory write port, the memory read port, the memory flush port, and the memory update port.

10. A method comprising:
    routing, by a memory bus switch, transactions from a plurality of memory buses to one or more SRAM blocks, wherein each SRAM block comprises a DRAM write queue and a DRAM read queue coupled to a DRAM controller; and routing, by a memory pool switch, transactions from the one or more SRAM blocks to one or more memory arrays, wherein each memory array comprises a NVRAM array coupled to an NVRAM controller.

11. The method of claim 10, wherein the plurality of memory buses comprises two or more of a non-cacheable bus, a cacheable bus, an NPU bus, a GPU bus, and a media processor bus.

12. The method of claim 10, wherein the one or more memory arrays comprises one or more DRAM arrays coupled to a DRAM controller.

13. The method of claim 10, wherein each of the one or more SRAM blocks comprises a NVRAM write queue and a NVRAM read queue coupled to the NVRAM controller.

14. A method comprising:
   routing, by a memory bus switch, transactions from a plurality of memory buses to one or more SRAM blocks; and
   routing, by a memory pool switch, transactions from the one or more SRAM blocks to one or more memory arrays;
   wherein each of the one or more SRAM blocks comprises:
      a memory write port for memory write transactions;
      a memory read port for memory read transactions;
      a memory flush port for memory flush transactions; and
      a memory update port for memory update transactions.

15. The method of claim 14, wherein each of the one or more SRAM blocks comprises:
   a memory write port FIFO coupled to the memory write port;
   a memory read port FIFO coupled to the memory read port;
   a memory flush port FIFO coupled to the memory flush port; and
   a memory update port FIFO coupled to the memory update port.

16. The method of claim 14, wherein the memory write port, the memory read port, the memory flush port, and the memory update port can receive transactions concurrently.

* * * * *